(12) United States Patent
Re Fiorentin

(10) Patent No.: US 7,591,759 B2
(45) Date of Patent: Sep. 22, 2009

(54) PROPULSION CONTROL SYSTEM FOR A MOTOR VEHICLE

(75) Inventor: Stefano Re Fiorentin, Grugliasco (IT)

(73) Assignee: Fiat Auto S.p.A., Turin (IT)

( * ) Notice: Subject to any disclaimer, the term of this patent is extended or adjusted under 35 U.S.C. 154(b) by 407 days.

(21) Appl. No.: 10/550,893

(22) PCT Filed: Mar. 24, 2004

(86) PCT No.: PCT/EP2004/003105

§ 371 (c)(1),
(2), (4) Date: Sep. 7, 2006

(87) PCT Pub. No.: WO2004/085818

PCT Pub. Date: Oct. 7, 2004

(65) Prior Publication Data

US 2007/0005210 A1 Jan. 4, 2007

(30) Foreign Application Priority Data

Mar. 27, 2003 (IT) .......................... TO2003A0233

(51) Int. Cl.
*B60W 10/04* (2006.01)
*B60W 10/02* (2006.01)
*G05G 1/14* (2006.01)

(52) U.S. Cl. .......................... 477/115; 477/5; 477/905; 74/513

(58) Field of Classification Search .................. 74/513, 74/514; 477/3, 53, 115, 905; 701/55, 56; 180/315, 335
See application file for complete search history.

(56) References Cited

U.S. PATENT DOCUMENTS

| 4,353,272 | A | 10/1982 | Helmut et al. |
| 5,568,797 | A | 10/1996 | Landerretche |
| 6,542,793 | B2* | 4/2003 | Kojima et al. .................. 701/1 |
| 6,684,145 | B1* | 1/2004 | Gianoglio et al. ............. 701/54 |
| 7,308,839 | B2* | 12/2007 | Hijikata ....................... 74/514 |
| 2003/0190996 | A1* | 10/2003 | Yone .......................... 477/120 |

FOREIGN PATENT DOCUMENTS

| EP | 0 559 342 A | 9/1993 |
| EP | 1 052 400 A | 11/2000 |
| GB | 2 114 717 A | 8/1983 |
| JP | 05 231194 A | 9/1993 |
| WO | WO 01/02210 A | 1/2001 |

* cited by examiner

*Primary Examiner*—Roger Pang
(74) *Attorney, Agent, or Firm*—Sughrue Mion, PLLC

(57) ABSTRACT

The system controls the propulsion of a motor vehicle with a propulsion system (1) which includes an internal combustion engine (E) with a shaft (S) for coupling to a transmission (2). The system includes an accelerator (A) with an associated sensor devices (S1) for supplying electrical signals indicating the force (FP) applied on the accelerator (A) by the driver, and an actuator device (6) operable to alter the position of the accelerator (A).; sensor devices (S2) supplying electrical signals indicating the speed of rotation (n) of the shaft (S) and/or the vehicle speed (V); and an electronic control unit (SCU) operable to control the propulsion system (1) in dependence on the signals supplied by the sensor devices (S1) and (S2). The control unit (SCU) acquires the signals generated by the sensor (S1) and establish an instantaneous value for the traction force (FX) to be developed on the ground by the drive wheels (W) corresponding to the instantaneous value of the force (FP) applied to the accelerator (A); and control the actuator device (6) in such a way that this latter tends to place the accelerator (A) in a position which corresponds to the instantaneous value of the vehicle speed (V).

8 Claims, 4 Drawing Sheets

PROPULSION CONTROL SYSTEM FOR A MOTOR VEHICLE

This is a National Stage entry of International Application PCT/EP2004/003105, with an international filing date of Mar. 24, 2004, which was published as WO 2004/085818 A1, and the complete disclosure of which is incorporated into this application by reference.

BACKGROUND OF THE INVENTION

The present invention relates to a propulsion control system for a motor vehicle having a propulsion system which includes an internal combustion engine with a shaft that can be coupled to a transmission system which includes a gearbox.

More specifically, the invention relates to a control system including
- a control accelerator having associated electrical detector means,
- sensor means operable to supply electrical signals indicative of the speed of rotation of the engine shaft and/or the speed at which the vehicle is moving, and
- electronic control means operable to control the propulsion system of the motor vehicle in a predetermined manner in dependence on the signals supplied by the aforesaid detection means and the said sensor means.

In a prior art method which is widely used, the command given by means of the accelerator pedal of a motor vehicle is interpreted by an engine management unit according to a so-called "driveability map" stored in a memory, which ensures that each position of the accelerator pedal and each speed of rotation of the drive shaft corresponds unequivocally to a pre-established drive torque value generated by the engine itself. In such a system, the command given by means of the accelerator is thus directly "translated" by the operating system of the engine into a value of drive torque transmitted to the drive shaft, in dependence on the speed of rotation of the engine.

According to a more recent method, described for example in the international Patent Application WO-A-01/02210, a system for controlling the propulsion of a motor vehicle includes control means operable, in a pre-established manner, to determine the power to be applied to the drive wheels in dependence on the detected position of the accelerator pedal and of the speed of the vehicle (either calculated or acquired), and then to calculate—in dependence on the value of power to be applied to the drive wheels and the speed of the vehicle— the drive torque which must be correspondingly generated by the engine. Such a system is essentially based on the idea of using the accelerator pedal not to control the drive torque generated by the engine but rather directly to control the power applied to the drive wheels of the motor vehicle. In such a system the accelerator pedal is of course of an entirely "passive" type.

SUMMARY OF THE INVENTION

The object of the present invention is to provide an innovative propulsion control system for a motor vehicle.

This and other objects are achieved according to the invention by providing a propulsion control system of the type specified above, primarily characterized in that
associated with the accelerator are
a sensor operable to provide signals indicative of the force applied to the said accelerator by the driver, and
an actuator device operable to modify the position of the said accelerator, and in that the control means are operable to:
acquire the signals emitted by the said sensor and calculate an instantaneous traction force value to be generated on the ground by the drive wheels, corresponding to the instantaneous value of the force applied to the accelerator by the driver; and
control the said actuator device in such a way that it tends to place the accelerator in a position which corresponds, according to a pre-established function, to the instantaneous value of the speed of the motor vehicle.

In the system of the invention, the accelerator therefore becomes an "active" component.

BRIEF DESCRIPTION OF THE DRAWINGS

Further characteristics and advantages of the invention will become apparent from the detailed description which follows, provided purely by way of non-limitative example, with reference to the appended drawings, in which.

DETAILED DESCRIPTION OF THE INVENTION

Figure 1:
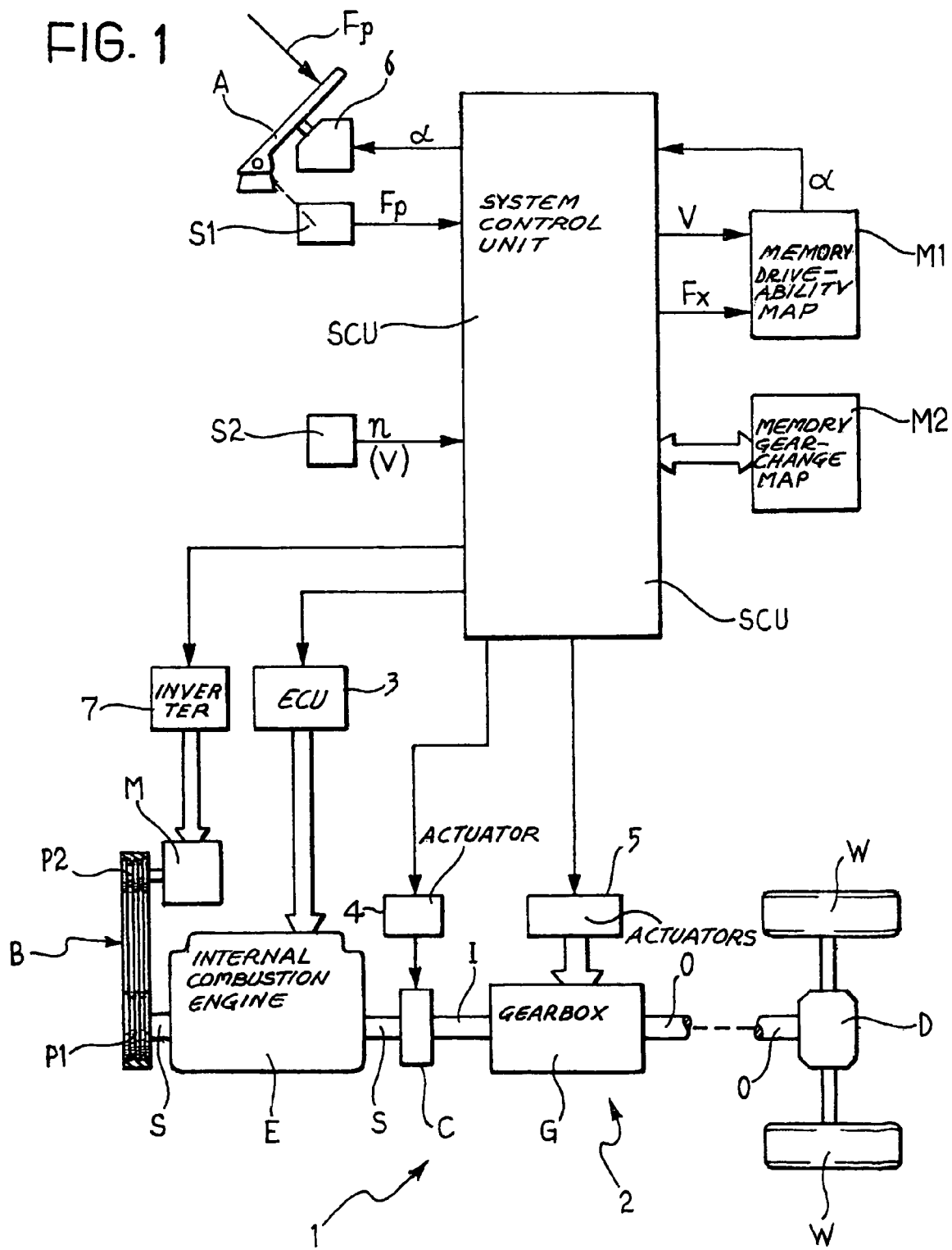
FIG. 1 is a block diagram of a control system of the invention.

In FIG. 1, the propulsion system of a motor vehicle is generally indicated 1. In the example illustrated, the propulsion system 1 includes an internal combustion engine E with a drive shaft S for coupling to a transmission 2 by means of a servo-controlled clutch C. The transmission 2 includes a gearbox G with discrete speed ratios, of a geared type, with an input shaft I and an output shaft O.

The input shaft I of the gearbox G can be coupled to the shaft S of the engine E by means of the clutch C. The output shaft O of the gearbox G is coupled to a pair of drive wheels W by means of a differential D of a type which is known per se.

The transmission system described above and illustrated in FIG. 1 is provided purely by way of example and is therefore non-limitative.

An electronic control unit (ECU) 3, of a type known per se, is associated with the internal combustion engine E.

The clutch C is servo-controllable by means of an associated actuator device 4 controlled either electrically or electro-hydraulically.

The gearbox G has a plurality of associated electrically or hydro-electrically controlled actuator devices, generally indicated 5, operable to engage or disengage the gears corresponding to the various available speed ratios.

The propulsion control system schematically illustrated in FIG. 1 includes an electronic system control unit SCU, connected to the control unit 3 associated with the engine E and to the actuators 4 and 5 associated with the clutch C and the gearbox G respectively.

The propulsion control system also includes a control accelerator A, which in the embodiment illustrated is of a conventional pedal type.

A sensor S1 is associated with the accelerator A for providing the system control unit SCU with electrical signals indicating the intensity of the force $F_p$ applied to the accelerator A by the user.

The accelerator A also has an associated actuator device 6, operated either electrically or electro-hydraulically, controlled by the system control unit SCU. This actuator device is operable to modify the position a of the accelerator A, in a manner instructions which will be more fully described later.

A further sensor S2 is connected to the unit SCU for supplying electrical signals indicating the speed of rotation (number of revolutions n in unit time) of the shaft S of the engine E, or the speed of travel V of the motor vehicle. If the sensor S2 supplies electrical signals indicating the speed of rotation of the shaft of the engine E, the unit SCU can deduce the travel speed V of the vehicle, provided it knows the radius of the wheels, the instantaneous value of the current speed ratio of the gearbox G and the back axle ratio.

As will become apparent later in this description, the system illustrated schematically in FIG. 1 is arranged to control the propulsion system 1 in a manner established in dependence on signals provided by the sensors S1 and S2 (and by any additional sensors which are not illustrated).

In particular, according to the present description the system control unit SCU is operable to acquire signals supplied by the sensor S1 and to determine, in ways which will be described, an instantaneous value of the traction force $F_x$ which is to be generated on the ground by the drive wheels W, which corresponds to the instantaneous value of the force $F_p$ applied to the accelerator A by the driver.

The system control unit SCU is also operable to control the actuator device 6 in such a way that it tends to place the accelerator A in a position which corresponds, according to a predetermined function, to the instantaneous value of the speed V of the motor vehicle.

Figure 2:
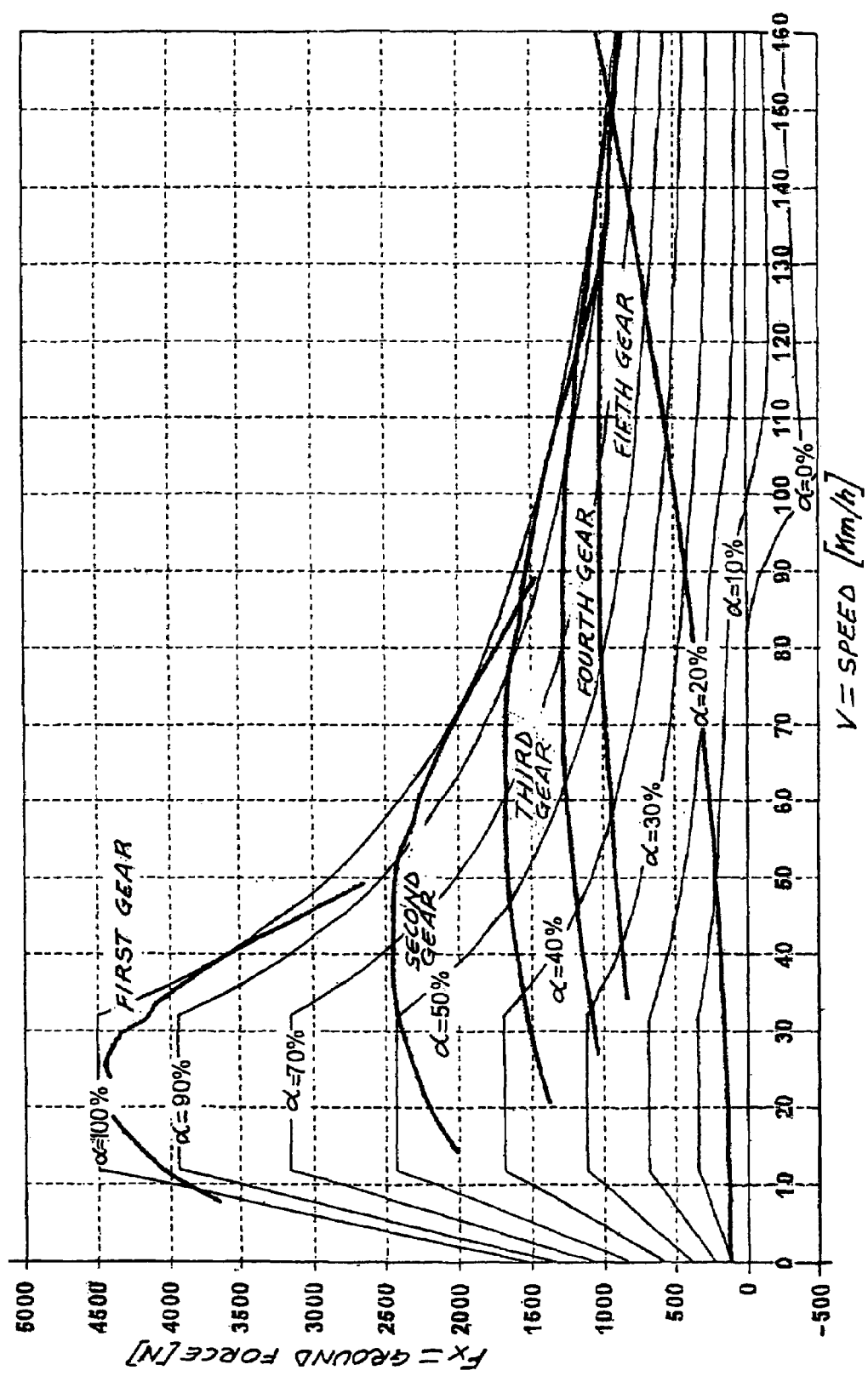
FIG. 2 is a diagram illustrating the correlation, in a system according to the invention, between the force applied to the accelerator, the speed of the motor vehicle and the traction force generated on the ground by the drive wheels.

To this end, it is convenient if a memory M1 is associated with the system control unit SCU, storing data correlating the force $F_p$, exerted on the accelerator A, with the travel speed V of the motor vehicle and with the traction force $F_x$ developed on the ground. These data define a "driveability map" such as that shown in FIG. 2, relating to a propulsion system where an internal combustion engine is associated with a five-speed gearbox.

Figure 3:
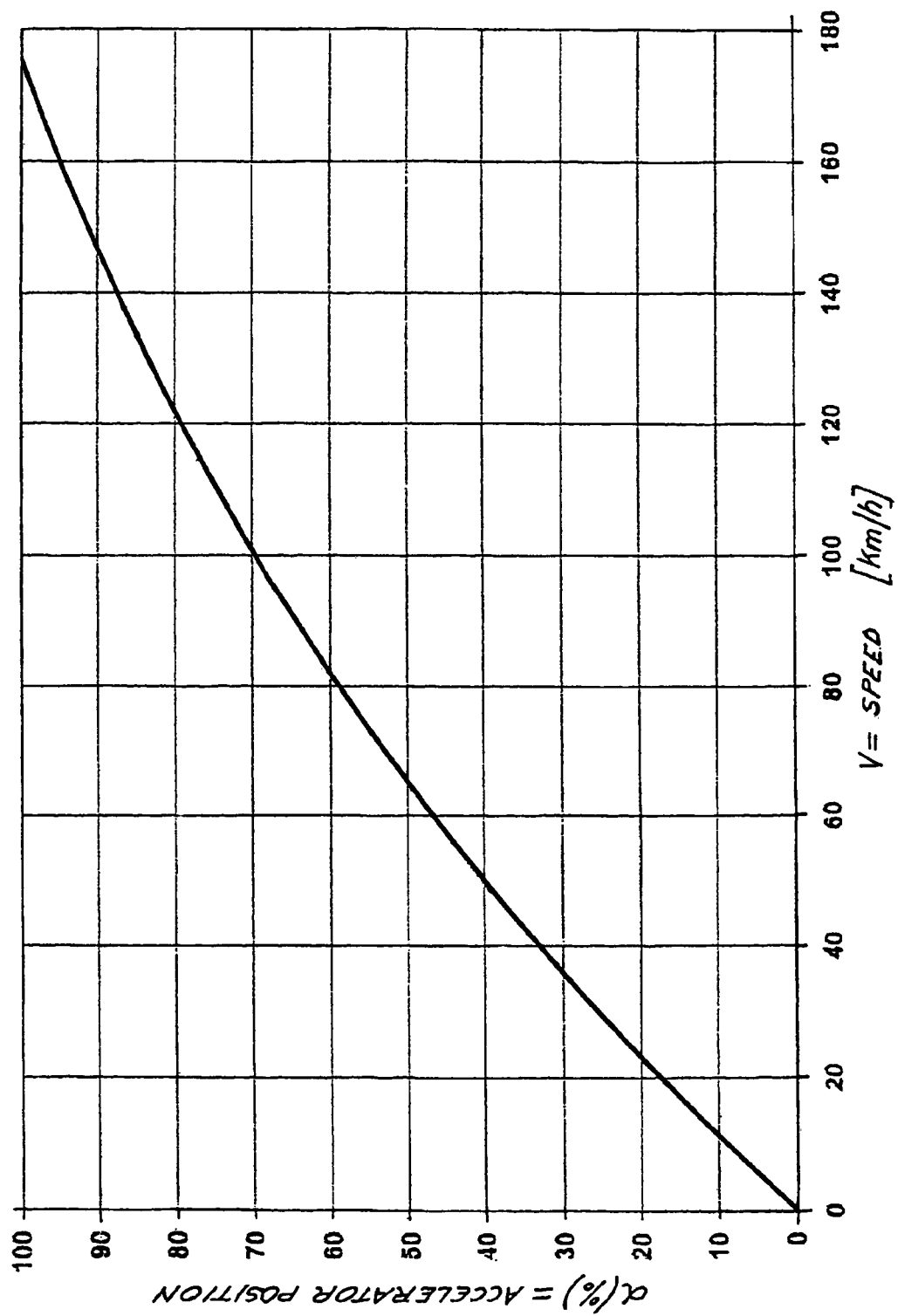
FIG. 3 is a diagram illustrating the correlation, in a system according to the invention, between the position of the accelerator pedal and the speed of the motor vehicle.

As stated earlier, the unit SCU is operable to control the actuator 6 in such a way that this places the accelerator A in a position corresponding to an instantaneous value of the motor vehicle speed V according to a pre-established function. This pre-established function can be of a linear or non-linear type, such as the function represented by the graph of FIG. 3, for example.

In view of the above, the system of the invention effectively operates a "driveability map" based on dynamic variables of the whole motor vehicle, as well as on the force on the ground and the travel speed of the vehicle.

The command given by means of the accelerator A correlates in practice the force $F_p$ exerted thereon by the driver with the force $F_x$ effectively developed on the ground and makes the angular position or travel α of the accelerator A a function of the speed V of the motor vehicle.

It is convenient if the law of correlation between $F_x$ and $F_p$ and between α and V are determined on the basis of considerations of ergonomics and driveability.

The accelerator A plays a key role in the system of the invention, one which is active rather than passive. Essentially, while a conventional accelerator must basically overcome the resistance of an opposing spring, in a system of the invention the force $F_p$, exerted on the accelerator and the position or travel α of the accelerator are in direct correlation with the actual dynamics of the motor vehicle, thereby "returning" to the driver a real sensation of the effect caused by his actions, that is the sensation of being "connected" to the vehicle, as happens with the servo-controls used in aviation: the force $F_p$ exerted on the accelerator A is the command, corresponding to the traction force $F_x$, while the position or travel α of the accelerator A is the speed feedback. Although in the control system of the invention the command is imparted by means of the force $F_p$ exerted on the accelerator A, the driver could perceive the accelerator not only as a control means in terms of force, generating a position feedback, but could also perceive the accelerator as a position control device, generating a force feedback. In any case, the feedback sensation would be compatible with the actual dynamic state of the vehicle and with its temporal variation.

This dual force-position command represents an advantage in terms of stability of control for the driver and in so far as it increases the pleasure of driving.

Two situations are described by way of example.

With the control system of the invention, if at the end of a burst of acceleration the driver wants to stabilize the speed of the vehicle at a value just achieved, he need only leave his foot on the accelerator in its current position. The force to be exerted on the accelerator will drop rapidly from the value applied during the preceding burst of acceleration to the value now required to maintain the vehicle at the speed which has been achieved.

In another situation, for example, if while travelling at a constant speed the motor vehicle faces a change in incline, in order to maintain a constant travel speed the driver need only hold the position of the accelerator A. He will feel a reaction force in the accelerator pedal which will increase if the road goes uphill or decrease if the road goes downhill.

The system according to the invention enables the driver directly to manage the ground force $F_x$, by means of the accelerator, independently of the choice of speed ratios (made during the design phase) and of the operating choice of gear, this latter can then be made on purely objective grounds, rather than on partly subjective ones as tended to happen in the prior art.

The system of the invention gives the driver an excellent driving sensation, thanks to the tight correlation between the command and the resulting action and thanks to the speed feedback.

The system also makes it possible to implement control arrangements which cannot be achieved with conventional arrangements, thanks to the fact that the ground force $F_x$ also depends on the travel speed V of the motor vehicle. It is thus possible to recover at least part of the power absorbed by resistance to the forward movement of the motor vehicle, thus further enhancing performance.

As stated earlier, a driveability map related to the ground force makes the command given by means of the accelerator substantially "independent" of the speed ratio: the command given by means of the accelerator directly determines the magnitude of the ground force $F_x$, independently of the current speed ratio.

The choice of speed ratio is therefore no longer linked to subjective criteria, depending on personal driving style but, insofar as the actual force $F_x$ corresponds to that requested by the driver by means of the accelerator A, the speed ratio can be selected, for example, on the basis of a desire to minimize fuel consumption by the engine E.

To this end, it is convenient if another memory M2 is associated with the system control unit SCU for storing data operable to define the speed ratio or gear to be selected in the gearbox G as a function of the traction force $F_x$ developed on the ground by the drive wheels W and of the speed V of the motor vehicle. The unit SCU is operable to select the gear to be used on the basis of data stored in the said memory M2.

Figure 4:
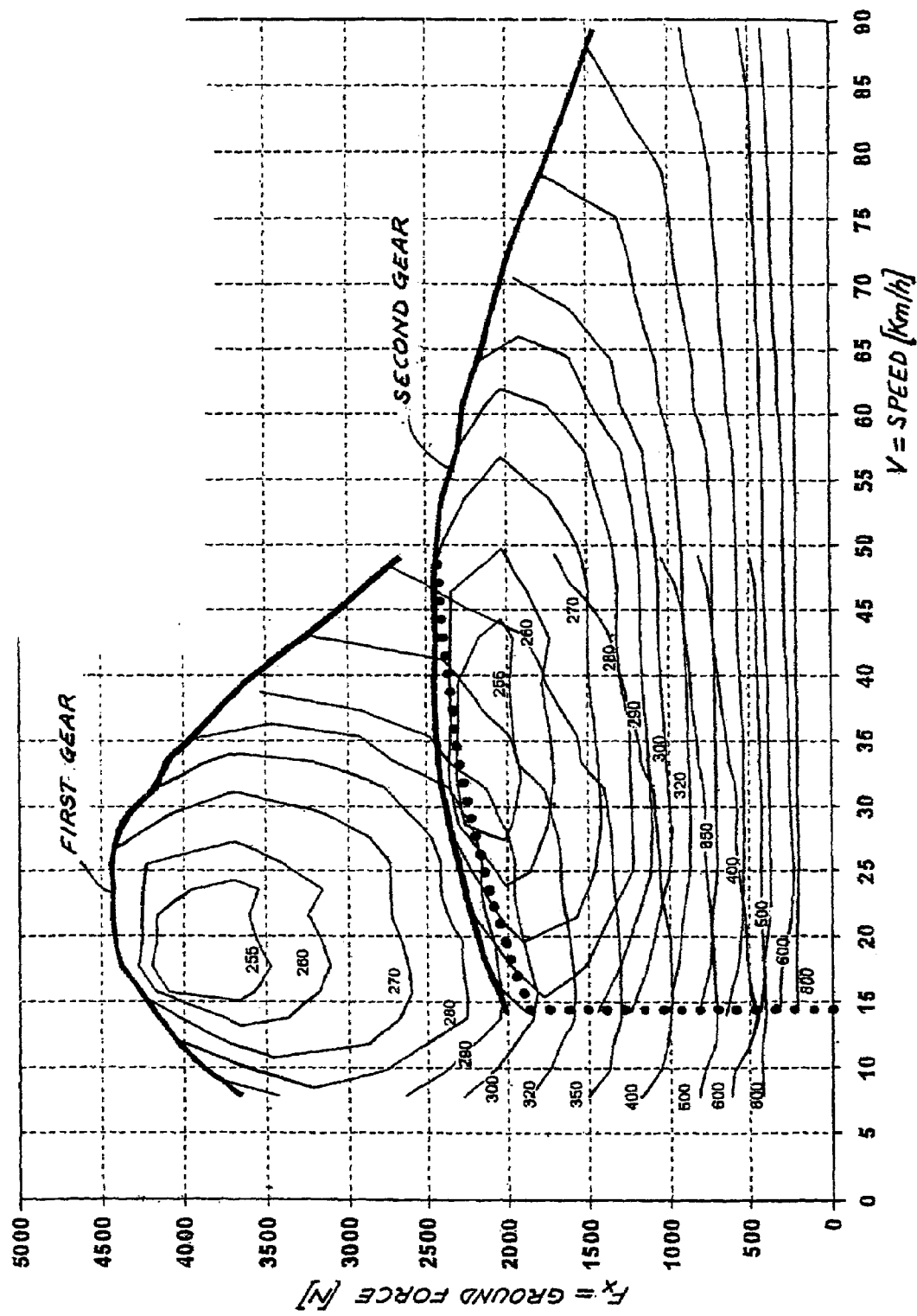
FIG. 4 is a diagram relating to the method of determining speed ratio change, as carried out in a system according to the invention.

The gear ratio maps stored in the memory M2 can be of the type illustrated in FIG. 4, for example, which relate to the first and second gears.

Data are also stored in the memory M2 representing gear change thresholds in the $F_x$, V plane. In FIG. 4, the broken line represents an example of a threshold for changing from first to second gear (changing up), while the dotted line represents the threshold for changing from second to first gear (changing down).

In general, the transition between two contiguous gears or speed ratios, whether changing up or down, is defined by boundary lines delimiting a region or field in the $F_x$/V plane which must be reachable both with the gear or ratio being changed from or with the gear or ratio being changed into.

It is convenient if the gear-change threshold is established on the basis of minimizing fuel consumption. The fine lines in FIG. 4 show iso-consumption lines (in g/h) for the first and second gears.

Descending gear changes (down) require a different threshold from that corresponding to a change (up) in order to avoid problems of over-gearing in the region of the threshold itself.

The control system of the invention enables so-called engine braking to be managed in a new and different way, thereby making a considerable contribution to reducing fuel consumption. In order to reduce this consumption, it is convenient to eliminate use of engine braking at times when the accelerator pedal is released when driving in town or, for example, at speeds below 80 km/h.

In the range of values of speed V in which the accelerator pedal A manages only positive ground forces $F_x$, the clutch C (see FIG. 1) must be promptly disengaged each time the accelerator pedal A is released (free-wheeling function). The clutch C must quickly be re-engaged as soon as pressure is put on the accelerator pedal A again.

With reference to FIG. 1, in the embodiment illustrated by way of example, a transmission with belt B and pulleys P1 and P2 couples the shaft S of the internal combustion engine E to a reversible electric machine, operable to act as electricity generator (alternator) and as electric motor. An inverter circuit 7 is associated with the machine M and controlled by the system control unit SCU.

When operating as an electric motor, the machine M is able to replace the electric starting motor that is usually connected to an internal combustion engine E.

By means of the engine management unit ECU 3, the system control unit SCU is operable to turn off the internal combustion engine E each time the accelerator A is released for longer than a predetermined period and the clutch C is disengaged, except if it is already disengaged owing to a change of gear. The system control unit SCU is also operable to restart the internal combustion engine E by means of the machine M acting as motor, as soon as the accelerator A is acted on once again.

The arrangements described above make it possible to achieve considerable reductions in fuel consumption, in return for an extremely modest increase in the cost of the system.

Naturally, the principle of the invention remaining unchanged, embodiments and manufacturing details may vary widely from those described and illustrated purely by way of non-limitative example, without departing thereby from the scope of the invention as claimed in the appended Claims.

The invention claimed is:

1. A propulsion control system for a motor vehicle having a propulsion system (1) which includes an internal combustion engine (E) with a shaft (S) that can be coupled to a transmission (2) including a gearbox (G);

the system including:
    a control accelerator (A) with associated electrical detector means (S1);
    sensor means (S2) for supplying electrical signals indicating a speed of rotation (n) of the shaft (S) of the engine (E) and/or a speed (V) of the motor vehicle; and
    electronic control means (SCU) operable to control the propulsion system (1) of the motor vehicle in a predetermined manner in dependence on signals supplied by said detector means (S1) and said sensor means (S2);

wherein the accelerator (A) is associated with:
    a sensor (S1) operable to supply electrical signals indicating a force ($F_p$) applied to the accelerator (A) by the driver, and
    an actuator device (6) operable to modify the position of said accelerator (A), and in that the system control means (SCU) are operable to:
        acquire the signals emitted by said sensor (S1) and establish an instantaneous traction force ($F_x$), which drive wheels (W) will develop on the ground, corresponding to the instantaneous value of the force ($F_p$) applied to the accelerator (A) by a driver; and
        control said actuator device (6) in such a way that it tends to place the accelerator (A) in a position corresponding, according to a predetermined function, to the instantaneous value of the speed (V) of the motor vehicle.

2. A control system according to claim 1, in which first memory means (M1) are associated with said control means (SCU) for storing data for defining a driveability map which correlates values of the force applied to the accelerator (A) with the travel speed (V) of the motor vehicle and with the traction force ($F_x$) developed on the ground.

3. A control system according to claim 1, for a motor vehicle with a servo-assisted gearbox (G) using gears, with an input shaft (I) for coupling to the shaft (S) of the engine (E) by means of a servo-controlled clutch (C); respective first and second electrically controlled actuator means (4, 5) being associated with the gearbox (G) and the clutch (C);
    the system being characterized in that said control means (SCU) are operable in a predetermined manner to determine which speed ratio to select in the gearbox (G), in accordance with criteria aimed at reducing the fuel consumption of the engine (E).

4. A control system according to claim 3 including second memory means (M2), associated with the control means (SCU) and storing data for defining the speed ratio or gear to be used in the gearbox (G) in dependence on the traction force ($F_x$) that the drive wheels (W) develop on the ground and on the speed (V) of the vehicle, and in which said control means (SCU) are operable to determine the gear to be used on the basis of data stored in said second memory means (M2).

5. A control system according to claim 4, in which said second memory means (M2) contain data which, in a ground traction force/vehicle speed plane ($F_x$/V), represent thresholds for gear change; the change from one gear to that immediately above (or below) having a different threshold from that for a change the other way.

6. A control system according to claim 2, in which said driveability map is such that, for values of vehicle speed (V) lower than a pre-established threshold, non-negative values of traction force ($F_x$) on the ground correspond to values of the force applied to the accelerator (A).

7. A control system according to claim 6 in which said control means (SCU) are operable to cause a clutch (C) to disengage when the accelerator (A) is released while the vehicle speed (V) is less than said predetermined value and the driver is not changing gear; said clutch (C) being re-engaged as soon as the accelerator (A) is acted on again.

8. A control system according to claim 7, for a motor vehicle in which a reversible electric machine (M), operable to act as electricity generator and as electric motor, is coupled to the internal combustion engine (E) and in which an electronic control unit (3) is associated with the internal combustion engine (E);

the system being characterized in that said control means (SCU) are operable to cause the internal combustion engine (E) to be switched off, by means of said electronic control unit (3), each time the accelerator (A) is released and te clutch (C) is disengaged, except when the clutch (C) has been disengaged in order to change gear; and cause the internal combustion engine (E) to be started again by means of the electric machine (M) operating as a motor, as soon as the accelerator (A) is operated once again.

\* \* \* \* \*